United States Patent
Lee et al.

(10) Patent No.: US 9,257,935 B2
(45) Date of Patent: Feb. 9, 2016

(54) MOTOR CONTROL APPARATUS AND METHOD

(71) Applicant: LG ELECTRONICS INC., Seoul (KR)

(72) Inventors: Juhyoung Lee, Seoul (KR); Jinhee Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 8 days.

(21) Appl. No.: 14/161,359

(22) Filed: Jan. 22, 2014

(65) Prior Publication Data

US 2014/0203747 A1    Jul. 24, 2014

(30) Foreign Application Priority Data

Jan. 23, 2013  (KR) .................. 10-2013-0007523

(51) Int. Cl.
*H02P 7/00* (2006.01)
*H02P 29/02* (2006.01)
*H02P 7/06* (2006.01)

(52) U.S. Cl.
CPC . *H02P 29/02* (2013.01); *H02P 7/06* (2013.01)

(58) Field of Classification Search
CPC . H02P 21/0035; H02P 21/0089; H02P 6/085; H02P 6/20; H02P 21/0021; H02P 21/06; H02P 2205/05; H02P 23/004; H02P 25/021; H02P 25/08; H02P 27/047; H02P 29/021; H02P 29/027; H02P 6/002
USPC .......... 318/432, 434, 400.01, 400.22, 400.23, 318/400.26, 773
See application file for complete search history.

(56) References Cited

U.S. PATENT DOCUMENTS

| | | | | |
|---|---|---|---|---|
| 3,983,463 A | * | 9/1976 | Nabae et al. .................. | 318/803 |
| 4,085,355 A | * | 4/1978 | Fradella ....................... | 318/703 |
| 4,158,163 A | * | 6/1979 | Eriksen et al. ................ | 318/798 |
| 4,305,471 A | * | 12/1981 | Eshghy .......................... | 173/183 |
| 4,306,449 A | * | 12/1981 | Hoffman ..................... | 73/114.25 |
| 4,427,930 A | * | 1/1984 | Berman et al. ................ | 388/811 |
| 4,587,469 A | * | 5/1986 | Ikebe et al. .................. | 318/432 |
| 4,659,976 A | * | 4/1987 | Johanson ..................... | 388/816 |
| 5,272,429 A | * | 12/1993 | Lipo et al. .................... | 318/808 |
| 5,293,760 A | * | 3/1994 | Tani et al. .................... | 68/12.02 |

(Continued)

FOREIGN PATENT DOCUMENTS

CN           101507097 A        8/2009

OTHER PUBLICATIONS

Chinese Office Action dated Nov. 3, 2015 issued in Application No. 201410015474.3.

*Primary Examiner* — Paul Ip
(74) *Attorney, Agent, or Firm* — Ked & Associates, LLP

(57) ABSTRACT

A motor control apparatus and method are provided. The motor control apparatus may include a power supply device supplying power to a motor, a power control device selectively blocking current supplied to the motor depending on whether or not the current supplied from the power supply device to the motor is greater than a reference current value, a controller that controls an intensity of the current supplied from the power supply device to the motor, and a load torque detector that detects a load torque generated by the motor as the motor rotates. The controller controls a maximum value of the current to be supplied to the motor so that the maximum value is less than the reference current value when the maximum value of the load torque detected by the load torque detector is greater than a maximum motor output due corresponding to the reference current value.

14 Claims, 8 Drawing Sheets

(56) References Cited

U.S. PATENT DOCUMENTS

| | | | |
|---|---|---|---|
| 5,428,285 A * | 6/1995 | Koyama et al. | 318/799 |
| 6,008,616 A * | 12/1999 | Nagayama et al. | 318/773 |
| 6,014,004 A * | 1/2000 | Hamaoka et al. | 318/778 |
| 6,075,332 A * | 6/2000 | McCann | 318/432 |
| 6,091,170 A * | 7/2000 | Mayes et al. | 310/68 B |
| 6,283,252 B1 * | 9/2001 | Lee | 187/291 |
| 6,615,595 B2 * | 9/2003 | Baruschke et al. | 62/133 |
| 6,690,139 B1 * | 2/2004 | Seibel | 318/798 |
| 6,864,654 B1 * | 3/2005 | Letor et al. | 318/434 |
| 8,098,035 B2 * | 1/2012 | Sekimoto et al. | 318/432 |
| 8,102,133 B2 * | 1/2012 | Yang et al. | 318/400.01 |
| 8,390,235 B2 * | 3/2013 | Bagarelli et al. | 318/696 |
| 8,604,735 B2 * | 12/2013 | Filka et al. | 318/432 |
| 2008/0100249 A1 * | 5/2008 | Coutu | 318/561 |
| 2009/0251086 A1 * | 10/2009 | Sekimoto et al. | 318/400.23 |
| 2010/0007295 A1 * | 1/2010 | Yang et al. | 318/400.22 |
| 2010/0066286 A1 * | 3/2010 | Furuki et al. | 318/400.26 |
| 2010/0253260 A1 * | 10/2010 | Doyama et al. | 318/400.14 |
| 2011/0050152 A1 * | 3/2011 | Filka et al. | 318/719 |
| 2012/0153886 A1 * | 6/2012 | Dwersteg et al. | 318/696 |
| 2012/0274247 A1 * | 11/2012 | Zhao et al. | 318/400.01 |
| 2012/0293106 A1 * | 11/2012 | Hirt | 318/722 |
| 2013/0193891 A1 * | 8/2013 | Wood et al. | 318/434 |

\* cited by examiner

MOTOR CONTROL APPARATUS AND METHOD

CROSS-REFERENCE TO RELATED APPLICATION(S)

This application claims priority under 35 U.S.C. §119 to Korean Application No. 10-2013-0007523 filed in Korea on Jan. 23, 2013, whose entire disclosure is hereby incorporated by reference.

BACKGROUND

1. Field

This relates to a motor control apparatus and method.

2. Background

Compressors may supply compressed refrigerant to a refrigerant cycle. A motor control system in which vibration of is minimized during compressor operation may be advantageous in enhancing compressor efficiency and reliability.

BRIEF DESCRIPTION OF THE DRAWINGS

The embodiments will be described in detail with reference to the following drawings in which like reference numerals refer to like elements wherein.

DETAILED DESCRIPTION

Figure 1:
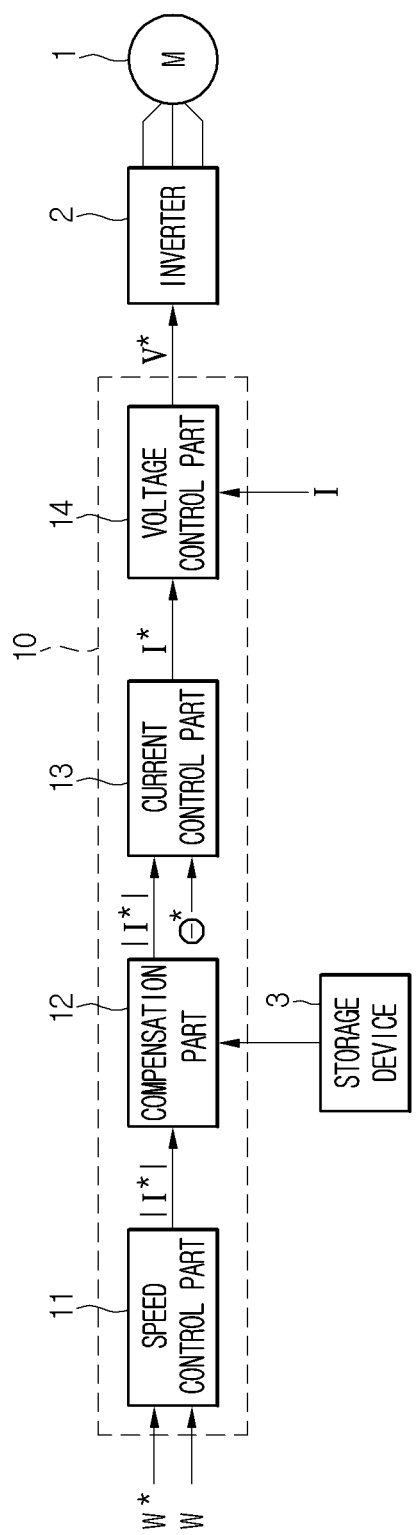
FIG. 1 is a block diagram of an exemplary motor control apparatus.

Referring to FIG. 1, an exemplary motor control apparatus may include a motor 1, an inverter 2, a storage device 3 for storing a torque pattern TP, and a controller 10. The controller 10 may include a speed control part 11 for outputting a reference current value so that a motor speed follows a reference speed, a compensation part 12 for compensating the reference current value to match the torque pattern TP, a current control part 13 for outputting the compensated reference current value as reference current, and a voltage control part 14 for outputting a reference voltage so that current flowing into the motor follows the reference current.

Figure 2A:
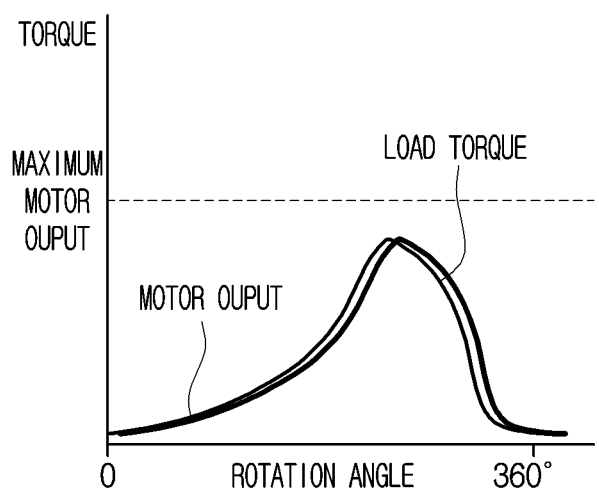
FIGS. 2A and 2B are graphs comparing motor output for various rotation angles of the apparatus shown in FIG. 1.

The motor control apparatus shown in FIG. 1 may make changes in intensity of current to generate a motor output corresponding to the torque pattern TP of a load torque acting on the motor, thereby supplying the current changing in intensity to the motor through the above-described components, as shown in FIG. 2A. When controlled in this manner, the motor may operate at a constant speed. This constant speed operation of the motor may reduce vibration, which may reduce noise and possible breakdown of the compressor.

Figure 2B:
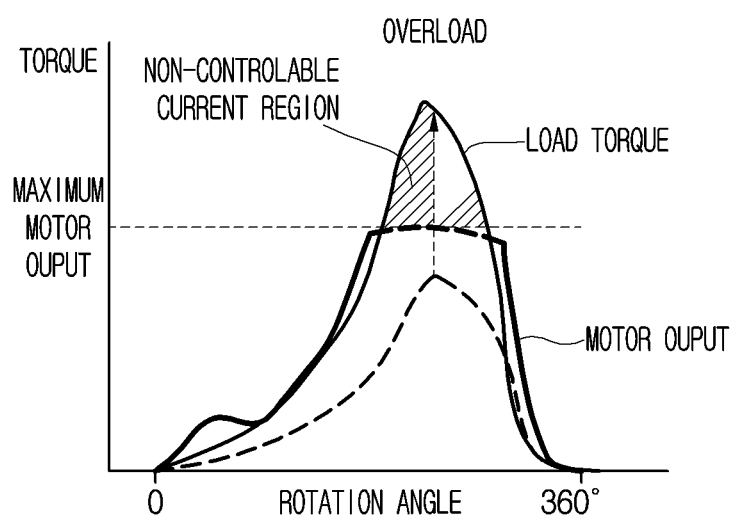

However, the motor control apparatus shown in FIG. 1 may not be applied in a state where the motor is in a saturation state. That is, as shown in FIG. 2B, the motor may have a reasonable maximum motor output, and thus, the saturation may represent a phenomenon in which at least one portion of the load torque inputted into the torque pattern TP is greater than the maximum motor output. If the load torque acting on the motor increases above the maximum motor output, a current greater than the motor's maximum current value must be supplied to maintain constant speed operation of the motor. Thus, since it may be difficult to supply a current greater than the maximum current, the motor control method discussed with respect to FIG. 1 may not be applied in this case.

Hereinafter, a chilling device according to another embodiment will now be described in detail with reference to the accompanying drawings.

Figure 3:
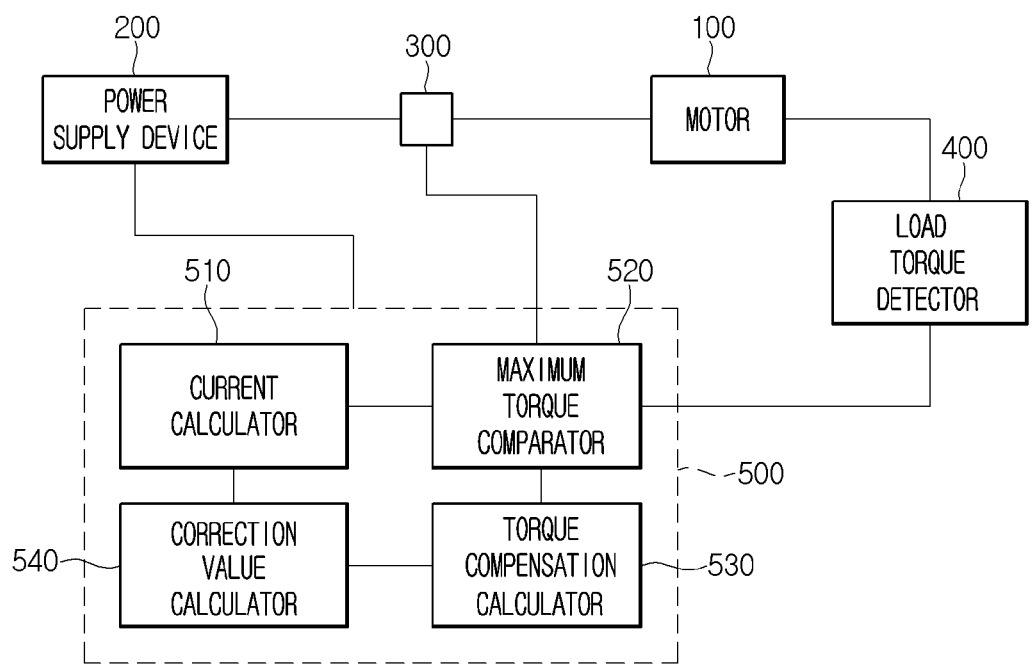
FIG. 3 is a block diagram of a motor control apparatus according to an embodiment as broadly described herein.

Referring to FIG. 3, a motor control apparatus according to an embodiment may include a motor 100, a power supply unit 200, or power supply device 200, a load torque detection unit 400, or load torque detection device 400, and a controller 500. The motor 100 may provide rotation force to a member connected thereto when power is supplied to the motor 100. For example, the motor 100 may be a motor for rotating a rolling piston of a rotary compressor.

Figure 4:
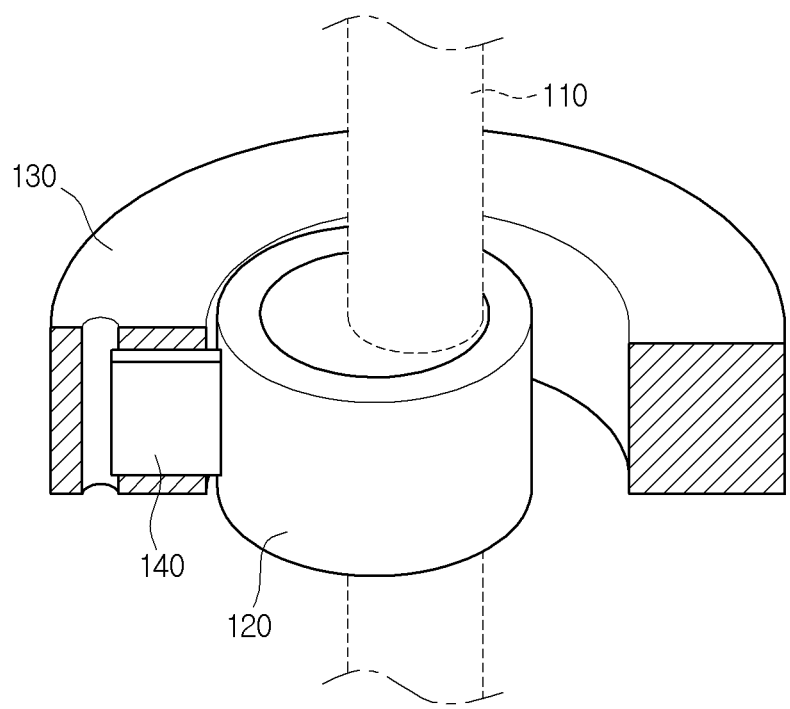
FIG. 4 is a partial cross-sectional perspective view of a one-piston rotary compressor including a motor, according to an embodiment as broadly described herein.

Referring to FIG. 4, the rotary compressor may include a motor 100, a rotation shaft 110, a rolling piston 120, a cylinder 130, and a vane 140. When power is supplied to the motor 100, the motor 100 connected to the rotation shaft 110 may rotate the rotation shaft 110. As the rotation shaft 110 is rotated, the rolling piston 120 connected to the rotation shaft 110 may also be rotated. Since the rolling piston 120 is eccentrically coupled to the rotation shaft 110, the rolling piston 120 may be eccentrically rotated as the rotation shaft 110 is rotated.

The rolling piston 120 is rotated in a state where the rolling piston 120 is accommodated in the cylinder 130 to compress a refrigerant within the cylinder 130. The vane 140 may divide the inside of the cylinder 130 into a suction space and a compression space. The vane 140 is disposed in contact with an outer circumferential surface of the rolling piston 120.

While the rolling piston 120 is rotated, the vane 140 may linearly move. For example, in the arrangement shown in FIG. 4, the vane 140 may linearly move in left and right directions.

In a one-piston rotary compressor having the above-described structure, when a compression stroke of the rolling piston 120 is performed, the rotation shaft 110 coupled to the rolling piston 120 may vibrate while an inner circumferential surface of the rolling piston 120 contacts the inner circumferential surface of the cylinder 130 to compress the refrigerant. A motor control apparatus according to an embodiment may effectively reduce the vibration when the motor control apparatus is applied to such a one-piston rotary compressor.

The power supply device 200 supplies power to the motor 100. The power supply device 200 may supply current of various intensities to the motor 100 under the control of the controller 500.

A power device 300 is disposed between the motor 100 and the power supply device 200 to block a flow of current when current having a value above a reference current value flows. For example, the power device 300 may include a fuse that is turned off or cut off when the current having a value above the reference current value flows. If the fuse is cut off, a supply of current through the power device 300 may be prevented. Here, the reference current value of the power device 300 may be less than or equal to a maximum current value of the motor 100.

The load torque detection device 400 detects a load torque generated from the motor 100 when the motor 100 is rotated. The load torque detection device 400 may detect the load torque generated from the motor 100 in the form of a torque pattern TP of which one cycle is defined as a rotation angle of about 0° to about 360° in the rolling piston 110. Also, the torque pattern TP detected as the one cycle may be stored in a storage device.

The controller 500 may control the motor 100 so that a maximum current value supplied into the motor 100 is less than the reference current value when a maximum value of the load torque detected by the load torque detection device 400 is above the maximum motor output due to the reference current value of the power device 300. In addition, the controller 500 may control the motor 100 so that an acceleration rate of a motor rotation speed generated during one revolution of the motor 100 is equal to a deceleration rate of the motor rotation speed. Here, the one revolution of the motor 100 may be understood as a rotation number of the motor 100 corresponding to a situation where the rolling piston 110 is rotated from about 0° to about 360°.

In detail, a time period corresponding to the one revolution of the motor 100 may include a first period I from a position at which the vane 140 and the rolling piston 120 meet each other at a suction side to a position at which the load torque acting on the motor 100 reaches a maximum motor output by the rotation of the rolling piston 120, a second period II from the position at which the load torque reaches the maximum motor output to a position at which the load torque is less than the maximum motor output by the rotation of the rolling piston 120, and a third period III from the position at which the load torque is less than the maximum motor output to a position at which the vane 140 and the rolling piston 120 meet each other at a discharge side by the rotation of the rolling piston 120.

Here, the position at which the vane 140 and the rolling piston 120 meet each other at the suction side may represent a position corresponding to a point in time at which the compression of the refrigerant within the suction space starts with respect to the vane 140. That is, the position may be understood as a position at which the rolling piston 120 has a rotation angle of about 0°.

Also, the position at which the vane 140 and the rolling piston 120 meet each other at the discharge side may represent a position corresponding to a point in time at which the discharge of the refrigerant within the suction space starts with respect to the vane 140. That is, the position may be understood as a position at which the rolling piston 120 has a rotation angle of about 360°.

Figure 5A:
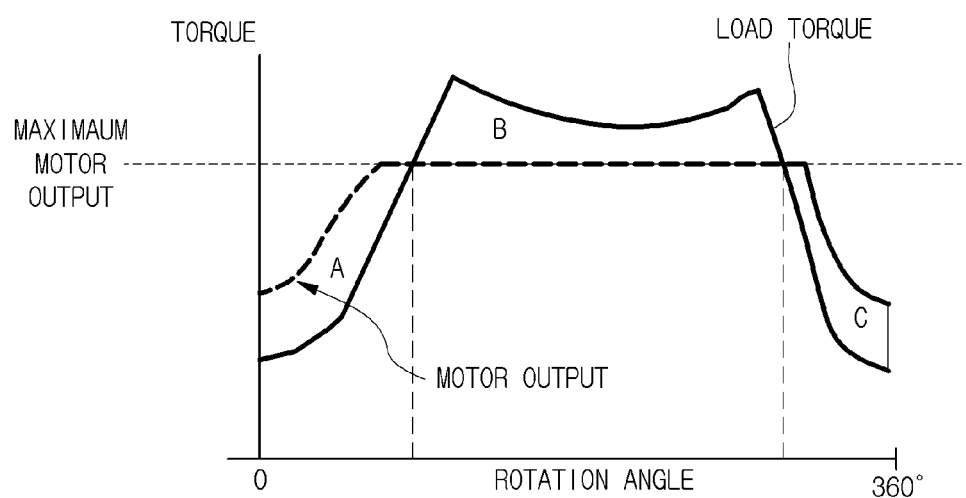
FIG. 5A is a graph of load torque and motor output when corrected torque compensation control in a motor control method is performed.
Figure 5B:
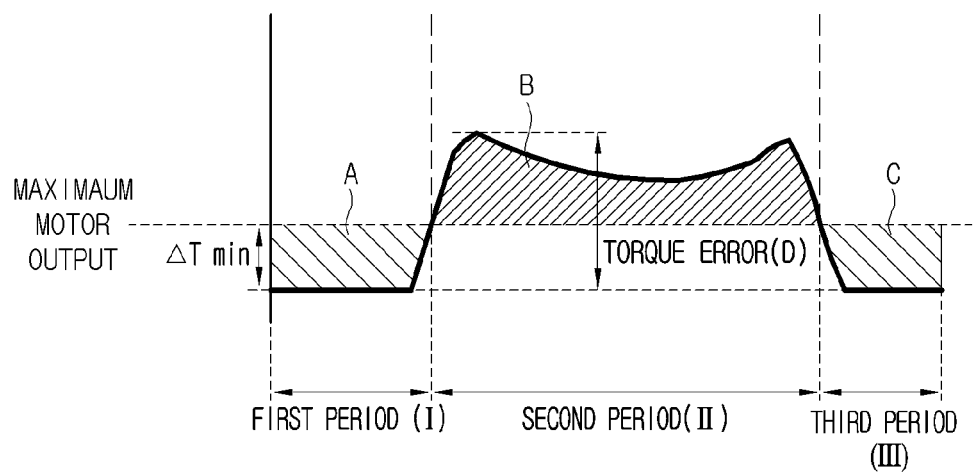
FIG. 5B is a graph of a difference between the load torque and the motor output in FIG. 5A.

As shown in the second period II of FIG. 5B, the controller 500 prevents current having a value greater than the reference current value from being supplied into the motor 100 through the power supply device 200 so that the fuse of the power device 300 is not cut off even though the load torque is significantly large.

Here, the reference current value of the power device 300 may correspond to the maximum motor output in FIG. 5A. The motor output may represent a torque value generated when current is supplied into the motor 100 because the maximum motor output is a torque value generated by supplying the reference current value to the motor 100.

However, since the load torque is greater than the motor output for the second period II, the motor rotation speed may be decelerated.

The controller 500 may control the motor rotation speed so that the sum of the total deceleration rate and the total acceleration rate of the motor rotation speed becomes zero within the one cycle (the rotation angle of about 0° to about 360° in the rolling piston 110) by overcoming the motor rotation speed, which is decelerated for the second period II, for the first and third periods I and III. Referring to FIGS. 5A and 5B, the total deceleration rate B of the motor rotation speed may be equal to the total acceleration rate (A+C) of the motor rotation speed.

Due to the above-described control of the controller 500, an average rotation speed of the motor in each of the cycles may be the same even though the motor 100 is operated with a plurality of cycles.

The controller 500 may include a current calculator 510, a maximum torque comparator 520, a torque compensation comparator 530, and a correction value calculator 540.

The current calculator 510 calculates current to be supplied into the motor 100 when a rotation speed value of the motor 100 is inputted.

The maximum torque comparator 520 compares the maximum value of the load torque detected by the load torque detection device 400 to the maximum motor torque due to the reference current value of the power device 300.

The torque compensation calculator 530 compensates the load torque to the current to be supplied into the motor 100, which is calculated by the current calculator 510, to calculate a current value. That is, the torque compensation calculator 530 calculates the current value so that the load torque acting on the motor 100 corresponds to the motor output generated from the motor 100.

The correction value calculator 540 corrects the current value calculated by the torque compensation calculator 530 when it is determined that the maximum value of the load torque is above the maximum motor torque due to the reference current value of the power device 300 in the maximum torque comparator 520.

In more detail, the correction value calculator 540 may correct the maximum value of the current supplied into the motor 100 so that the maximum current value is less than the reference current value of the power device 300 and correct the current value calculated by the torque compensation calculator 530 so that the acceleration rate of the motor rotation speed generated during the one revolution of the motor 100 is equal to the deceleration rate of the motor rotation speed.

The correction value calculator 540 calculates a value ΔTmin as shown in FIG. 5B to calculate a correction value. The value ΔTmin represents a difference between the maximum motor output and an actual motor output for the first and third periods I and III.

A process of calculating the value ΔTmin will be described with reference to FIGS. 5A and 5B.

The deceleration rate B of the motor rotation speed for the second period II is calculated. The deceleration rate B of the motor rotation speed for the second period II may be calculated on the basis of the load torque detected by the load torque detection unit 400.

Thereafter, an acceleration rate A of the motor rotation speed for the first period I and an acceleration rate C of the motor rotation speed for the third period III are determined so that the sum of the acceleration rate A of the motor rotation speed for the first period I and the acceleration rate C of the motor rotation speed for the third period III is equal to the deceleration rate B of the motor rotation speed for the second period II. Here, the value ΔTmin is calculated so that minimum values of the motor output for all of the first and third periods I and III are the same as the value ΔTmin.

As described above, when the value ΔTmin is calculated, a torque error D that is a difference between the maximum value of the load torque and the minimum value of the motor torque, which is illustrated in FIG. 5B may be minimized to minimize vibration.

Hereinafter, a motor control method according to an embodiment will be described with reference to the flowchart shown in FIG. 6.

Figure 6:
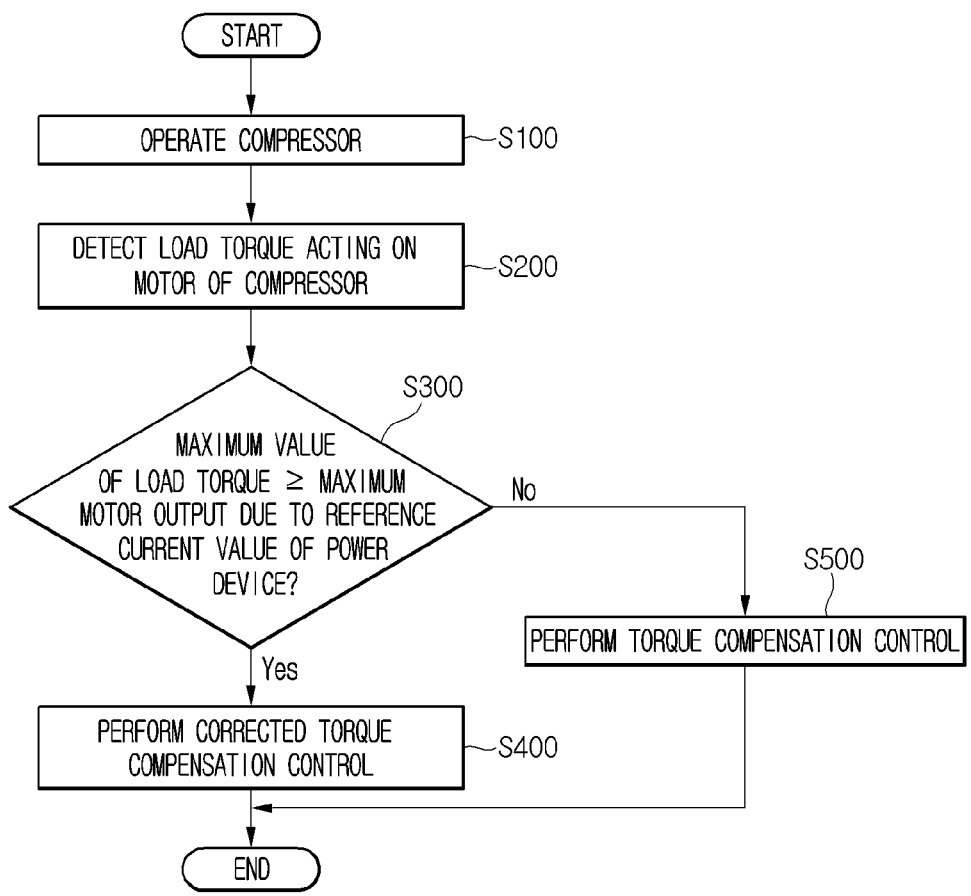
FIG. 6 is a flowchart of a motor control method according to an embodiment as broadly described herein.

Referring to FIG. 6, the motor control method according to an embodiment starts as an operation of a compressor starts (S100).

Thereafter, a load torque acting on the motor (see reference numeral 100 of FIG. 3) of the compressor is detected. In certain embodiments, the detection of the load torque may be performed by a load torque detector 400 (S200).

Then, it is determined whether a maximum value of the load torque is greater than a maximum motor output due to a reference current value of the power device (see reference numeral 300 of FIG. 3). Operation S300 may be performed by a maximum torque comparator 520 of a controller 500 (S300).

When it is determined that the maximum value of the load torque is greater than the maximum motor output in the operation S300, a corrected torque compensation control process is performed on the current supplied into the motor 100 (S400).

The corrected torque compensation control process may include an operation for controlling the maximum current value so that the maximum value of the current flowing into the motor 100 is less than the reference current value and controlling a motor rotation speed so that an acceleration rate of the motor rotation speed generated during one revolution of the motor 100 is equal to a deceleration rate of the motor rotation speed.

In detail, the corrected torque compensation control process may include an operation for controlling a current value so that the current value supplied into the motor 100 for the first and third periods I and III shown in FIGS. 5A-5B is greater than a value of current supplied into the motor 100 when torque compensation control (S500) is performed.

Also, the corrected torque compensation control process may include an operation for controlling the current supplied into the motor 100 so that the sum of the acceleration rate of the motor rotation speed for the first period I and the acceleration rate of the motor rotation speed for the third period III is equal to the deceleration rate of the motor rotation speed for the second period II.

Also, the corrected torque compensation control process may include an operation for controlling the current supplied into the motor 100 so that the acceleration rate of the motor rotation speed for the first period I and the acceleration rate of the motor rotation speed for the third period III are the same.

That is, while the motor 100 is rotated once, the corrected torque compensation control process may include two time periods in which the motor rotation speed is accelerated, and also, the current may be controlled so that the acceleration rates of the motor rotation speed for the two time periods are the same.

Also, when it is determined that the maximum value of the load torque is less than the maximum motor output in the operation S300, a torque compensation control process may be performed on the current supplied into the motor 100 (S500).

Here, the torque compensation control process may be an operation for controlling the current supplied into the motor 100 to generate a motor output corresponding to the load torque for rotating the motor 100 at a constant speed.

The foregoing embodiment may be applied even though the maximum value of the load torque is greater than the maximum motor output. As a result, vibration generated by the motor and the compressor may be reduced to minimize the occurrence of noise and breakdown.

Although the exemplary embodiments are described above, the present disclosure is not limited to the specific embodiments presented. That is, various changes and modifications may be made thereto by one skilled in the art without departing from the scope and spirit as broadly described herein and as set forth in the appended claims. It is also understood that the terms used herein are merely descriptive, rather than limiting, and that various changes may be made without departing from the scope and spirit as broadly described herein.

According to the embodiments, even though the motor is in the saturation state, the vibration generated by the motor may be reduced.

Thus, since the vibration generated in the motor is reduced, noise generated by the motor may be reduced possible breakdown may be avoided to extend the life cycle thereof.

Embodiments provide a motor control apparatus and method which are capable of being applied even though a motor is in a saturation state.

In one embodiment, a motor control apparatus as embodied and broadly described herein may include a power supply unit supporting power to a motor; a power device selectively blocking current supplied into the motor according to whether the current supplied from the power supply unit to the motor is above a reference current value; a control unit controlling an intensity of the current supplied from the power supply unit into the motor; and a load torque detection unit detecting a load torque generated in the motor when the motor is rotated, wherein the control unit controls a maximum value of the current to be supplied into the motor so that the maximum value is less than the reference current value when the maximum value of the load torque detected by the load torque detection unit is above a maximum motor output due to the reference current value.

When the maximum value of the load torque detected by the load torque detection unit is above the maximum motor output due to the reference current value, the control unit may control a motor rotation speed so that an acceleration rate of the motor rotation speed generated for one revolution of the motor is equal to a deceleration rate of the motor rotation speed.

The control unit may include: a current calculation part calculating the current to be supplied into the motor according to the rotation speed of the motor; a maximum torque comparison part comparing the maximum value of the load torque detected by the load torque detection unit to the maximum motor output; a torque compensation calculation part calculating a current value to be supplied into the motor to generate a motor output corresponding to the load torque; and a correction value calculation part correcting the current value calculated by the torque compensation calculation part when it is determined that the maximum value of the load torque is above the maximum motor output in the maximum torque comparison part.

The correction value calculation part may correct the maximum value of the current supplied into the motor so that the maximum value of the current is less than the reference current value and correct the current value calculated by the torque compensation calculation part so that the acceleration rate of the motor rotation speed generated for the one revolution of the motor is equal to the deceleration rate of the motor rotation speed.

The correction value calculation part may correct the current value calculated by the torque compensation calculation part so that a current value greater than the value of the current supplied into the motor is applied to generate a motor output corresponding to the load torque when the maximum value of the load torque detected by the load torque detection part is less than the maximum motor output due to the reference current value.

The correction value calculation part may correct the current value calculated by the torque compensation calculation part so that two time periods in which the motor rotation speed generated for the one revolution of the motor is accelerated, and acceleration rates of the motor rotation speed for the two time periods are the same.

The motor may include a motor rotating a rolling piston of a rotary compressor.

The power device may include a fuse that is turned off or cut off when the current supplied into the motor is above the reference current value.

In another embodiment, a motor control method includes: detecting a load torque acting on a motor when the motor is rotated; determining whether a maximum value of the load toque is above a maximum motor output due to reference value of a power device connected to the motor; and performing a corrected torque compensation control when the maximum value of the load torque is above the maximum motor output, wherein the performing of the corrected torque compensation control includes: controlling the maximum value of the current flowing into the motor is less than the reference current value; and controlling a motor rotation speed so that an acceleration rate of the motor rotation speed generated for one revolution of the motor is equal to a deceleration rate of the motor rotation speed.

The motor control method may further include performing a torque compensation control when the maximum value of the load torque is less than the maximum motor output, wherein the performing of the torque compensation control may include controlling current supplied into the motor to generate a motor output corresponding to the load torque, thereby rotating the motor at a constant speed.

A time period corresponding to the one revolution of the motor may include: a first period from a position at which a vane and a rolling piston meet each other at a suction side to a position at which the load torque acting on the motor reaches the maximum motor output by rotation of the rolling piston; a second period from the position at which the load torque reaches the maximum motor output to a position at which the load torque is less than the maximum motor output by the rotation of the rolling piston; and a third period from the position at which the load torque is less than the maximum motor output to a position at which the vane and the rolling piston meet each other at a discharge side by the rotation of the rolling piston, wherein the performing of the corrected torque compensation control may include controlling a value of the current supplied into the motor for the second period so that the current value is less than the reference current value.

The performing of the corrected torque compensation control may further include controlling a value of the current supplied into the motor for the first and third periods so that the current value is greater than the value of the current supplied into the motor when the torque compensation control is performed.

The performing of the corrected torque compensation control may further include controlling the current supplied into the motor so that the sum of an acceleration rate of the motor rotation speed for the first period and an acceleration rate of the motor rotation speed for the third period is equal to a deceleration rate of the motor rotation speed for the second period.

The performing of the corrected torque compensation control may further include controlling the current supplied into the motor so that an acceleration rate of the motor rotation speed for the first period and an acceleration rate of the motor rotation speed for the third period are the same.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor control apparatus, comprising:
    a power supply device that supplies power to a motor;
    a power control device that selectively blocks a current supplied to the motor when current supplied by the power supply device to the motor is greater than a reference current value;
    a controller that controls an intensity of current supplied by the power supply device to the motor; and
    a load torque detector that detects a load torque generated in the motor when the motor is rotated, wherein the controller includes:
        a current calculator that calculates current to be supplied to the motor according to a rotation speed of the motor;
        a torque compensation calculator that calculates a current value to be supplied to the motor to generate a motor output corresponding to the detected load torque; and
        a correction value calculator that corrects the current value calculated by the torque compensation calculator, wherein, when a maximum value of the load torque detected by the load torque detector is greater than a maximum motor output corresponding to the reference current value, the correction value calculator corrects a maximum value of the current supplied to the motor such that the maximum value of the current is less than the reference current value.

2. The motor control apparatus according to claim 1, wherein, when the maximum value of the load torque detected by the load torque detector is greater than the maximum motor output corresponding to the reference current value, the correction value calculator corrects the current value calculated by the torque compensation calculator to control the motor rotation speed so that an acceleration rate of the motor rotation speed generated for one revolution of the motor is equal to a deceleration rate of the motor rotation speed for one revolution of the motor.

3. The motor control apparatus according to claim 2, wherein the controller further includes a maximum torque comparator configured to compare the maximum value of the load torque detected by the load torque detector to the maximum motor output.

4. The motor control apparatus according to claim 1, wherein the correction value calculator corrects the current value calculated by the torque compensation calculator so that an acceleration rate of the motor rotation speed generated for one revolution of the motor is equal to a deceleration rate of the motor rotation speed generated for the one revolution of the motor.

5. The motor control apparatus according to claim 1, wherein, when the maximum value of the load torque detected by the load torque detector is less than the maximum motor output corresponding to the reference current value, the correction value calculator corrects the current value calculated by the torque compensation calculator such that a current value greater than the value of the current being supplied to the motor is applied to generate a motor output corresponding to the load torque.

6. The motor control apparatus according to claim 4, wherein the correction value calculator corrects the current value calculated by the torque compensation calculator so that two time periods in which the motor rotation speed generated for the one revolution of the motor is accelerated, and acceleration rates of the motor rotation speed for the two time periods are equal.

7. The motor control apparatus according to claim 1, wherein the motor is configured to rotate a rolling piston of a rotary compressor.

8. The motor control apparatus according to claim 1, wherein the power control device includes a switch which is turned off or cut off when the current supplied to the motor is greater than the reference current value.

9. A motor control method, comprising:
 detecting, by a load torque detector, a load torque acting on a motor as the motor is rotated;
 determining, by a maximum torque comparator, whether a maximum value of the load torque is greater than a maximum motor output corresponding to a reference current value of a power control device connected to the motor; and
 performing corrected torque compensation control when the maximum value of the load torque is greater than the maximum motor output, including:
  calculating by a torque compensation calculator, a current value to be supplied to the motor so that a motor output generated from the motor corresponds to the load torque acting on the motor;
  correcting, by a correction value calculator, a maximum value of current flowing into the motor such that the value of the current flowing into the motor is less than the reference current value; and
  correcting, by the correction value calculator, the current value calculated by the torque compensation calculator to control a motor rotation speed such that an acceleration rate of the motor rotation speed generated for one revolution of the motor is equal to a deceleration rate of the motor rotation speed generated for the one revolution of the motor.

10. The motor control method according to claim 9, further including performing torque compensation control when the maximum value of the load torque is less than the maximum motor output, including controlling current supplied to the motor to generate a motor output corresponding to the load torque, thereby rotating the motor at a constant speed.

11. The motor control method according to claim 10, wherein a time period corresponding to the one revolution of the motor includes:
 a first period from a position at which a vane and a rolling piston meet each other at a suction side to a position at which the load torque acting on the motor reaches the maximum motor output as the rolling piston rotates;
 a second period from the position at which the load torque reaches the maximum motor output to a position at which the load torque is less than the maximum motor output as the rolling piston rotates; and
 a third period from the position at which the load torque is less than the maximum motor output to a position at which the vane and the rolling piston meet each other at a discharge side as the rolling piston rotates, wherein performing the corrected torque compensation control includes controlling a value of the current supplied to the motor for the second period so that the current value is less than the reference current value.

12. The motor control method according to claim 11, wherein performing the corrected torque compensation control further includes controlling a value of the current supplied to the motor for the first and third periods so that the current value is greater than the value of the current supplied to the motor when the torque compensation control is performed.

13. The motor control method according to claim 11, wherein performing the corrected torque compensation control includes controlling the current supplied to the motor so that a sum of an acceleration rate of the motor rotation speed for the first period and an acceleration rate of the motor rotation speed for the third period is equal to a deceleration rate of the motor rotation speed for the second period.

14. The motor control method according to claim 11, wherein performing the corrected torque compensation control further includes controlling the current supplied to the motor so that an acceleration rate of the motor rotation speed for the first period and an acceleration rate of the motor rotation speed for the third period are equal.

* * * * *